US011230077B2

(12) United States Patent
Pillarisetty et al.

(10) Patent No.: US 11,230,077 B2
(45) Date of Patent: Jan. 25, 2022

(54) TOOLING INSPECTION SYSTEM FOR MULTI-TIP TABLET PUNCH

(71) Applicant: Industrial Pharmaceutical Resources, Inc., Bartlett, IL (US)

(72) Inventors: Vivek Pillarisetty, Hanover Park, IL (US); Mark Tate, Glen Ellyn, IL (US); Zach Culvey, Naperville, IL (US)

(73) Assignee: Industrial Pharmaceutical Resources, Inc., Bartlett, IL (US)

( * ) Notice: Subject to any disclaimer, the term of this patent is extended or adjusted under 35 U.S.C. 154(b) by 567 days.

(21) Appl. No.: 16/156,257

(22) Filed: Oct. 10, 2018

(65) Prior Publication Data

US 2020/0114607 A1    Apr. 16, 2020

(51) Int. Cl.
*B30B 11/00*    (2006.01)
*B30B 11/02*    (2006.01)
(Continued)

(52) U.S. Cl.
CPC .......... *B30B 11/027* (2013.01); *B23Q 17/008* (2013.01); *B23Q 17/248* (2013.01);
(Continued)

(58) Field of Classification Search
CPC . B23Q 17/008; B23Q 17/2461; B23Q 17/248
See application file for complete search history.

(56) References Cited

U.S. PATENT DOCUMENTS

| 5,768,138 A | 6/1998 | Ruotolo | |
| 6,451,228 B1 * | 9/2002 | Hinzpeter | B30B 11/005 |
| | | | 264/109 |

(Continued)

FOREIGN PATENT DOCUMENTS

JP    07266089 A  * 10/1995  ........... B30B 11/005

OTHER PUBLICATIONS

Natoli Engineering, Tablet Compression Tooling Management and Inspection System—Natoli Engineering, YouTube, https://www.youtube.com/watch?v=Ju_bd9bLMqg , Jun. 9, 2010 (Year: 2010).*

(Continued)

*Primary Examiner* — Timothy Kennedy
(74) *Attorney, Agent, or Firm* — Wood, Phillips, Katz, Clark & Mortimer

(57) ABSTRACT

A tooling inspection and analysis system measures tooling quality of a multi-tip tablet punch having a barrel with a plurality of tips each having a tip cup for forming a tablet. The system comprises a base. A carriage assembly has a cavity for supporting a multi-tip tablet punch, which when in use is aligned with an X-axis. A Y-axis linear slide mounts the carriage assembly to the base for movement relative to the base along a Y-axis. A sensor is adapted to measure distance. A Z-axis linear slide mounts the sensor to the base for movement relative to the base along a Z-axis. A programmable controller is operatively connected to the Y-axis linear slide, the Z-axis linear slide and the sensor. The controller is programmed to move the carriage assembly and the sensor to automatically align the sensor to measure working length of each tip of a multi-tip tablet punch mounted in the cavity.

22 Claims, 19 Drawing Sheets

(51) Int. Cl.
*B30B 15/26* (2006.01)
*B23Q 17/24* (2006.01)
*B23Q 17/00* (2006.01)
*G01C 3/08* (2006.01)

(52) U.S. Cl.
CPC .......... *B23Q 17/2461* (2013.01); *B30B 15/26* (2013.01); *G01C 3/08* (2013.01)

(56) References Cited

U.S. PATENT DOCUMENTS

| | | | |
|---|---|---|---|
| 7,125,234 B2* | 10/2006 | Scholz | B30B 11/005 |
| | | | 425/167 |
| 7,255,817 B2* | 8/2007 | Tazawa | B30B 11/005 |
| | | | 264/109 |
| 2002/0024166 A1* | 2/2002 | Fukada | B30B 15/065 |
| | | | 264/123 |
| 2014/0144205 A1* | 5/2014 | Schmidt | G01L 25/00 |
| | | | 73/1.08 |
| 2018/0328858 A1 | 11/2018 | Velayutham | |
| 2019/0099972 A1* | 4/2019 | Klaer | B30B 11/085 |
| 2020/0300758 A1* | 9/2020 | Teshima | G01N 21/55 |
| 2021/0154959 A1* | 5/2021 | Carstens | B30B 11/08 |

OTHER PUBLICATIONS

IPR, IPR Tablet Press Tooling Inspection System, YouTube, https://www.youtube.com/watch?v=LLhVG0-EPQU , Sep. 5, 2013 (Year: 2013).*

* cited by examiner

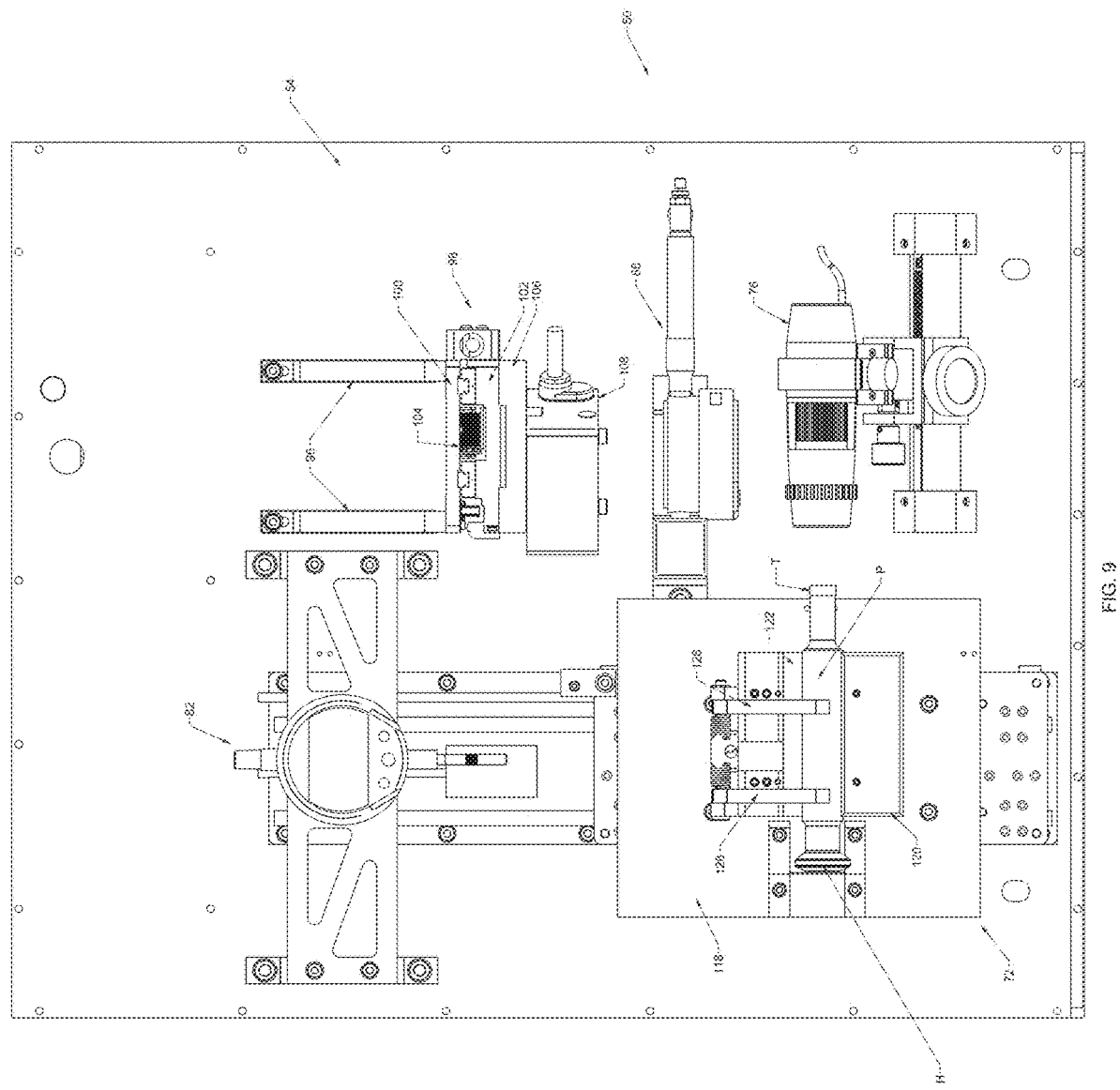

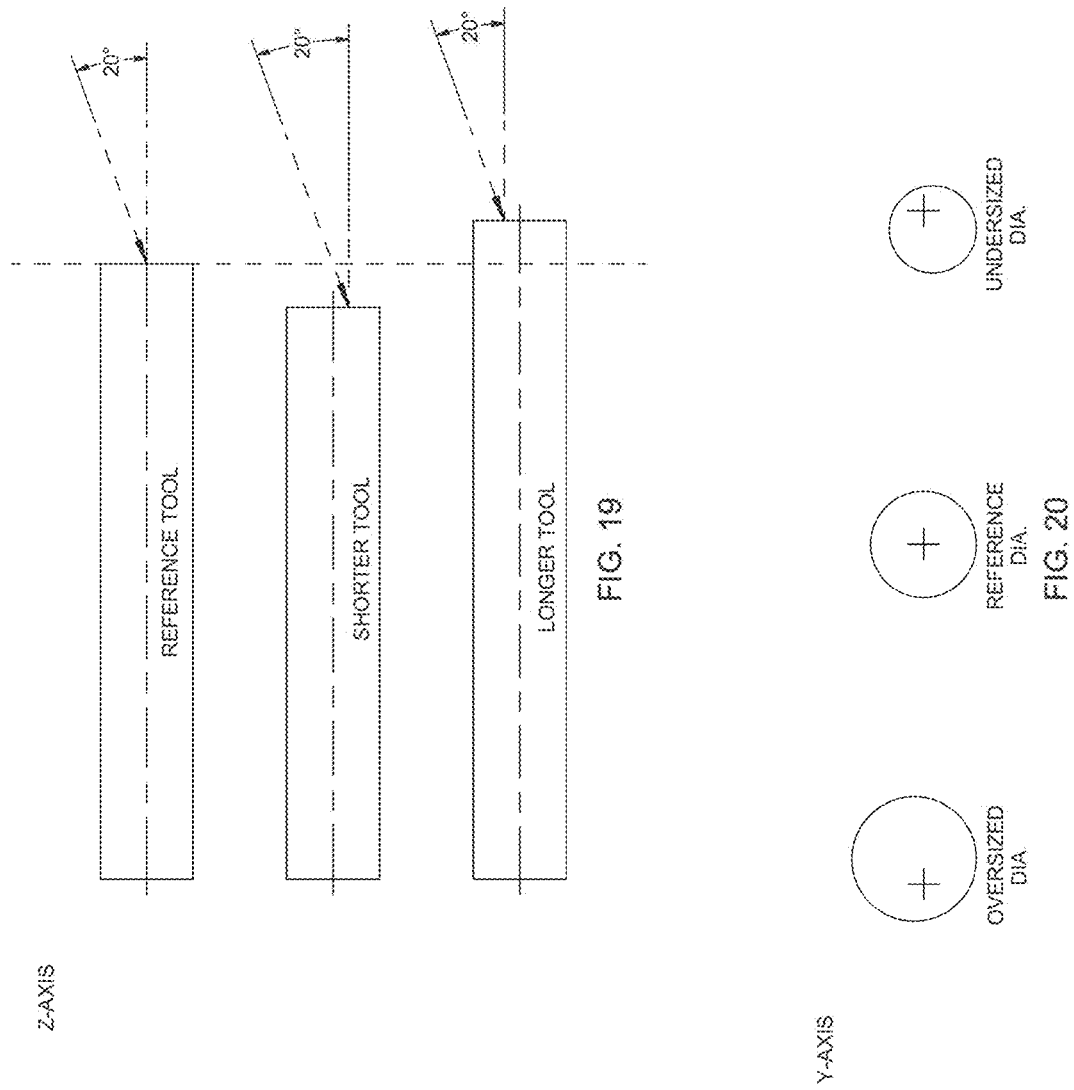

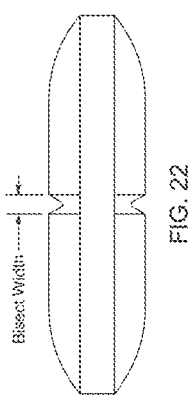

TOOLING INSPECTION SYSTEM FOR MULTI-TIP TABLET PUNCH

FIELD OF THE INVENTION

This invention relates to a tooling inspection and analysis system for use with multi-tip tablet punches.

BACKGROUND OF THE INVENTION

Oral dosage medication is typically manufactured by directly compressing granulation on a rotary tablet press. Tooling is used on the tablet press to identify and produce specific products. The tooling consists of an upper punch, lower punch, and a die.

All granulations are abrasive and, due to the force at compaction, tools wear out and must be replaced. Maintaining quality tooling is essential to product consistency. Many pharmaceutical manufacturers currently use manual procedures for measuring tooling quality, but the data is not readily accessible or easily interpreted and the process can be time consuming.

A known tooling inspection and analysis system (TIAS) automatically inspects the tooling and allows users to store tooling measurements for historical analysis and reporting. The known TIAS is adapted for use with a punch having a single tip. The single tip is uniformly positioned along an axis of the punch so that measurement is straight-forward and consistent.

More recently, rotary tablet presses have been provided with multi-tip tooling in which the upper punch, lower punch, and die are configured to compress granulation for plural tablets simultaneously. While the punches could locate the tips at any position, the tips are typically positioned symmetrically and in a pattern dependent on the shape of the tip as well as the size. The introduction of multi-tip tooling presents additional difficulties in measuring tooling quality. Numerous different tip configurations can be used. Manually measuring tooling quality is even more difficult with a multi-tip punch as each tip must be measured individually. Difficulties with automatic measurement exist as the tip pattern and size, and the like, must be accounted for as well as the alignment of the punch in the measurement system.

The present application is directed to improvements in tooling measurement and analysis for multi-tip tooling.

SUMMARY OF THE INVENTION

As described herein, a tooling inspection and analysis system for a multi-tip punch controls positioning by securing a punch along an X-axis and controlling relative movement of the punch and a sensor along a Y-axis and a Z-axis to measure quality.

There is disclosed in accordance with one aspect, a tooling inspection and analysis system for measuring tooling quality of a multi-tip tablet punch having a barrel with a plurality of tips each having a tip cup for forming a tablet. The system comprises a base. A carriage assembly has a cavity supporting a multi-tip tablet punch, in use, aligned with an X-axis. A Y-axis linear slide mounts the carriage assembly to the base for movement relative to the base along a Y-axis. A sensor is adapted to measure distance. A programmable controller is operatively connected to the carriage assembly and the sensor. The controller is programmed to move at least one of the carriage assembly and the sensor relative to one another to automatically align the sensor to measure working length of each tip of a multi-tip tablet punch mounted in the cavity.

It is a feature that a Z-axis linear slide mounts the sensor to the base for movement relative to the base along a Z-axis. The programmable controller may be operatively connected to the Y-axis linear slide, the Z-axis linear slide and the sensor, the controller being programmed to move the carriage assembly and the sensor to automatically align the sensor to measure a working length of each tip of a multi-tip tablet punch mounted in the cavity It is a feature that the multi-tip tablet punch may have a plurality of tips aligned in a pitch circle about a center of the multi-tip tablet punch to define an angle between each tip relative to the center. It is a feature that the controller is programmed to move the sensor relative to the multi-tip tablet punch mounted on the cavity to coordinate positions based on the angle between each tip.

It is another feature that the controller is programmed to measure offset of the multi-tip tablet punch relative to a desired orientation in the cavity and to move the sensor relative to the multi-tip tablet punch mounted in the cavity to coordinate positions based on the angle between each tip adjusted based on the offset.

It is an additional feature that the sensor comprises a laser displacement sensor. The laser displacement sensor may use optical triangulation to determine position.

It is a further feature to provide a barrel diameter indicator mounted to the base for measuring diameter of the barrel of a multi-tip tablet punch mounted in the cavity and the controller is programmed to position a carriage assembly to measure barrel diameter.

It is yet another feature to provide a length indicator mounted to the base for measuring overall length of a multi-tip tablet punch mounted in the cavity and the controller is programmed to position the carriage assembly relative to the punch length indicator to measure overall length. A solenoid is controlled by the controller for moving the length indicator along the X-axis to measure overall length of the multi-tip tablet punch.

It is still another feature that a camera is mounted to the base and aligned with the cavity in a loading position of the carriage assembly and the camera is connected to the controller for display on a user interface display.

There is disclosed in accordance with another aspect a tooling inspection and analysis system for measuring tooling quality of a multi-tip tablet punch having a barrel with a plurality of tips each having a tip cup for forming a tablet. The system comprises a base. A carriage assembly has a cavity supporting a multi-tip punch, in use, aligned with an X-axis. A Y-axis linear slide mounts the carriage assembly to the base for movement relative to the base along a Y-axis. A sensor is adapted to measure distance to an object. A Z-axis linear slide may mount the sensor to the base for movement relative to the base along a Z-axis. A database stores data for a plurality of multi-tip tablet punches and the data for a particular punch defines orientation of each tip relative to a center of the punch. A programmable controller is operatively connected to the carriage assembly and the sensor. The controller obtains data from the database for a multi-tip tablet punch being tested and is programmed to move at least one of the carriage assembly and the sensor to determine orientation of the multi-tip tablet punch in the cavity relative to a reference position and determine offset from the reference position and to automatically align the sensor responsive to the offset to measure working length of each tip of the punch being tested.

It is a feature that the multi-tip punch may have a plurality of tips aligned in a pitch circle about a center of the punch and the database stores diameter of each tip and pitch circle diameter for the pitch circle. It is a feature that the controller calculates a working area diameter of the pitch circle using the tip diameter and the pitch circle diameter and is programmed to move the sensor relative to the multi-tip tablet punch mounted in a cavity to measure angular position of an edge of a tip proximate the reference position relative to the reference position to determine an angular offset.

It is another feature that the controller is programmed to move the sensor relative to the multi-tip tablet punch mounted in the cavity to coordinate positions based on the angle between each tip and adjusted by the angular offset to measure working length of each tip of the multi-tip tablet punch being tested.

There is disclosed in accordance with another aspect of the invention a tooling inspection and analysis system for measuring tooling quality of a multi-tip tablet punch having a barrel with a plurality of tips each having a tip cup for forming a tablet. The system comprises a base. A carriage assembly has a cavity supporting a multi-tip punch, in use, aligned with an X-axis. The carriage has a plate mounted in the cavity and an adjustment screw to adjust orientation of the plate to adjust alignment of a punch in the cavity aligned with the X-axis. A Y-axis linear slide mounts the carriage assembly to the base for movement relative to the base along a Y-axis. A sensor is adapted to measure distance to an object. A programmable controller is operatively connected to the Y-axis linear slide and the sensor. The controller is programmed to move the carriage assembly to align the sensor to measure a gauge block mounted in the cavity to determine alignment of the plate relative to the X-axis responsive to adjustment of orientation of the plate.

It is a feature that the plate is pivotally mounted to a side wall in the cavity and the adjustment screw abuts one end of the plate and a spring punch plunger biases another end of the plate. The pivot is positioned between the adjustment screw and the spring plunger.

Further features will be readily apparent from the specification and from the drawings.

BRIEF DESCRIPTION OF THE DRAWINGS

FIG. 9 is a plan view illustrating the system of FIG. 5 with a punch mounted in a loading position;

FIG. 18 is a detailed flow diagram illustrating an automatic multi-tip measurement program;

FIG. 19 illustrate offset in center of a tool based on tool length;

FIG. 20 illustrates offset in center of a tool based on tool barrel diameter;

FIG. 22 illustrates a bisect in a tablet.

DETAILED DESCRIPTION OF THE INVENTION

Figure 1:
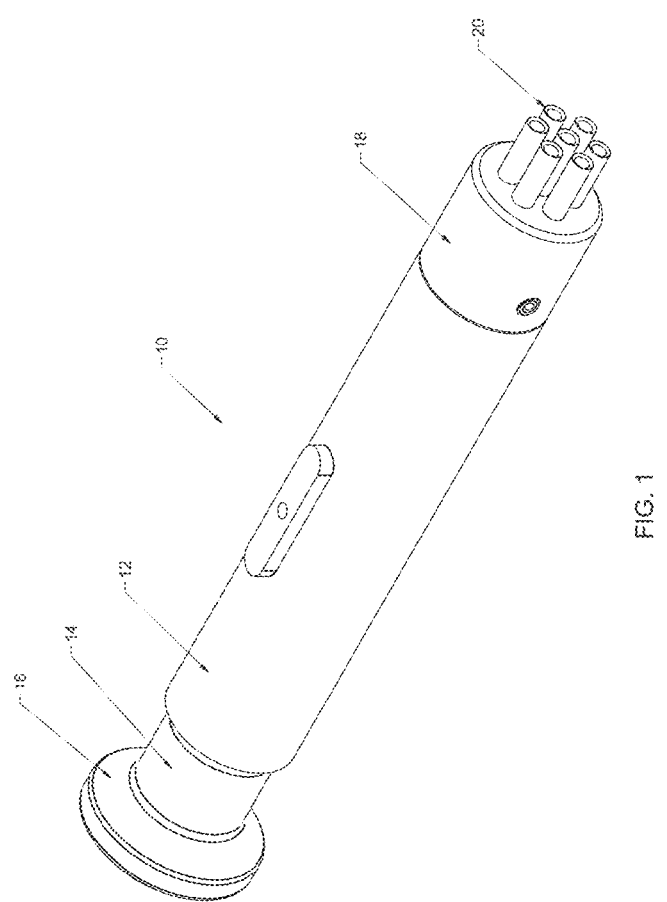
FIG. 1 is a perspective view of a multi-tip tablet punch having plural cylindrical tips.

Referring initially to FIG. 1, an exemplary multi-tip tablet punch 10 is illustrated. The punch 10 does not form part of the invention, but rather is an example of an upper punch or lower punch used in a rotary tablet press and which will be measured for tooling quality.

The punch 10 is of conventional construction and includes a barrel 12 and a neck 14, at one end of the barrel 12, connected to a head 16. A tip holder 18 is connected to an opposite end of the barrel 12 and includes a plurality of tips 20 extending therefrom. In the illustrated embodiment, there are seven tips 20, with one tip 20 in the center and the others equally angularly spaced in a circle around the center. Each of the tips 20 is cylindrical and of identical size.

Figure 1A:
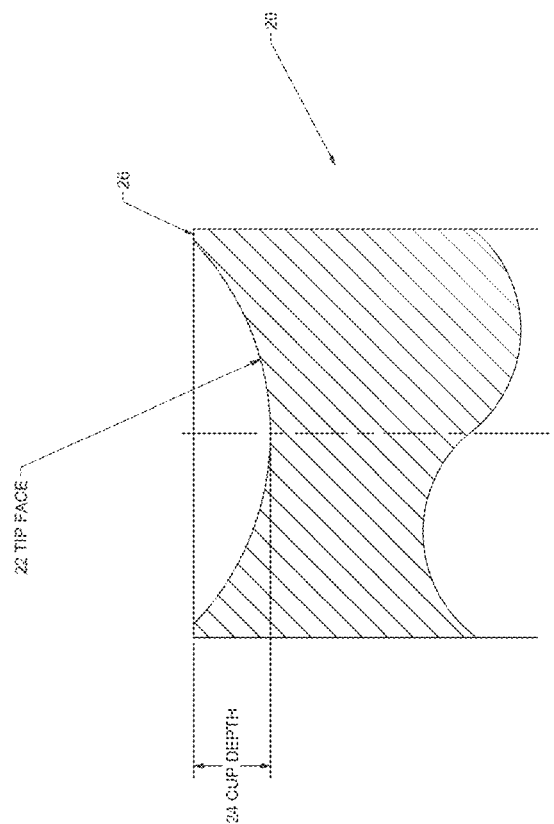
FIG. 1A is a detailed view illustrating a distal end of one of the tips of the multi-tip tablet punch of FIG. 1.

FIG. 1A illustrates a tip face 22 of a distal end of one of the tips 20. The tip face 22 is concave and has a cup depth 24 which represents distance from a distal edge 26 to the innermost portion of the tip face 22, which is generally in the center.

The standards for manufacturing of pharmaceutical products define standard terminology for tooling punches. Among the parameters are the overall length which is the length from the distal edge of the head 16 to the tip edge 26. The working length is the distance from the distal end of the head 16 to the innermost portion of the tip face 22. Thus, the working length is equal to the overall length less the cup depth 24.

Figure 2:
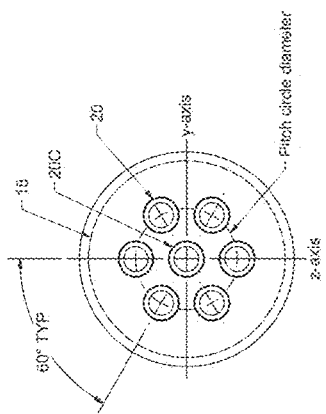
FIG. 2 is an end view illustrating relationships among the plural tips of the multi-tip tablet punch of FIG. 1.
Figure 3:
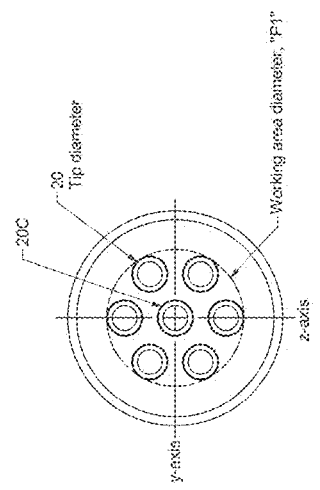
FIG. 3 is a view similar to FIG. 2 illustrating additional parameters.

FIG. 2 is an end view of the tip head 18 with the seven tips 20 and an overlay illustrating various relationships. As used herein, an X-axis represents the axis of the punch 10 and extends out of the page through the center tip 20C. The six outer tips 20 are located with their centers equally spaced from the X-axis a distance referred to as a pitch circle diameter. Also, the centers of each of the outer tips 20 are sixty degrees apart. In this orientation, the direction in a horizontal plane is referenced to a Y-axis, while the direction in a vertical plane is referenced to a Z-axis. FIG. 3 shows a similar overlay for the tips 20 but defines a working area diameter P1 which represents the outermost edge of each of the tips 20 relative to the X-axis. The working area diameter P1 is equal to the tip circle diameter plus the radius of each tip 20.

Figure 4:
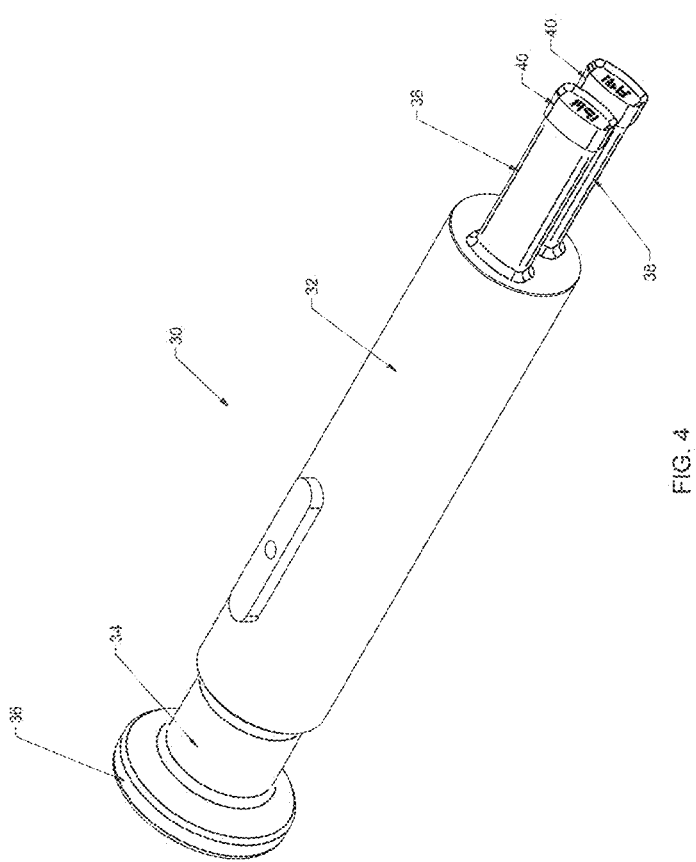
FIG. 4 is an alternative multi-tip tablet punch including a pair of generally oval shaped tips.

FIG. 4 illustrates an example of a multi-tip punch 30 having a different configuration of tips. Similar to the punch 10, the punch 30 includes a barrel 32, a neck 34 and a head 36. A pair of stems 38 each supports a tip 40. The tips 40 are non-circular and in the illustrated example are generally oval and both off center relative to the X-axis of the barrel 32, as is apparent.

Figure 5:
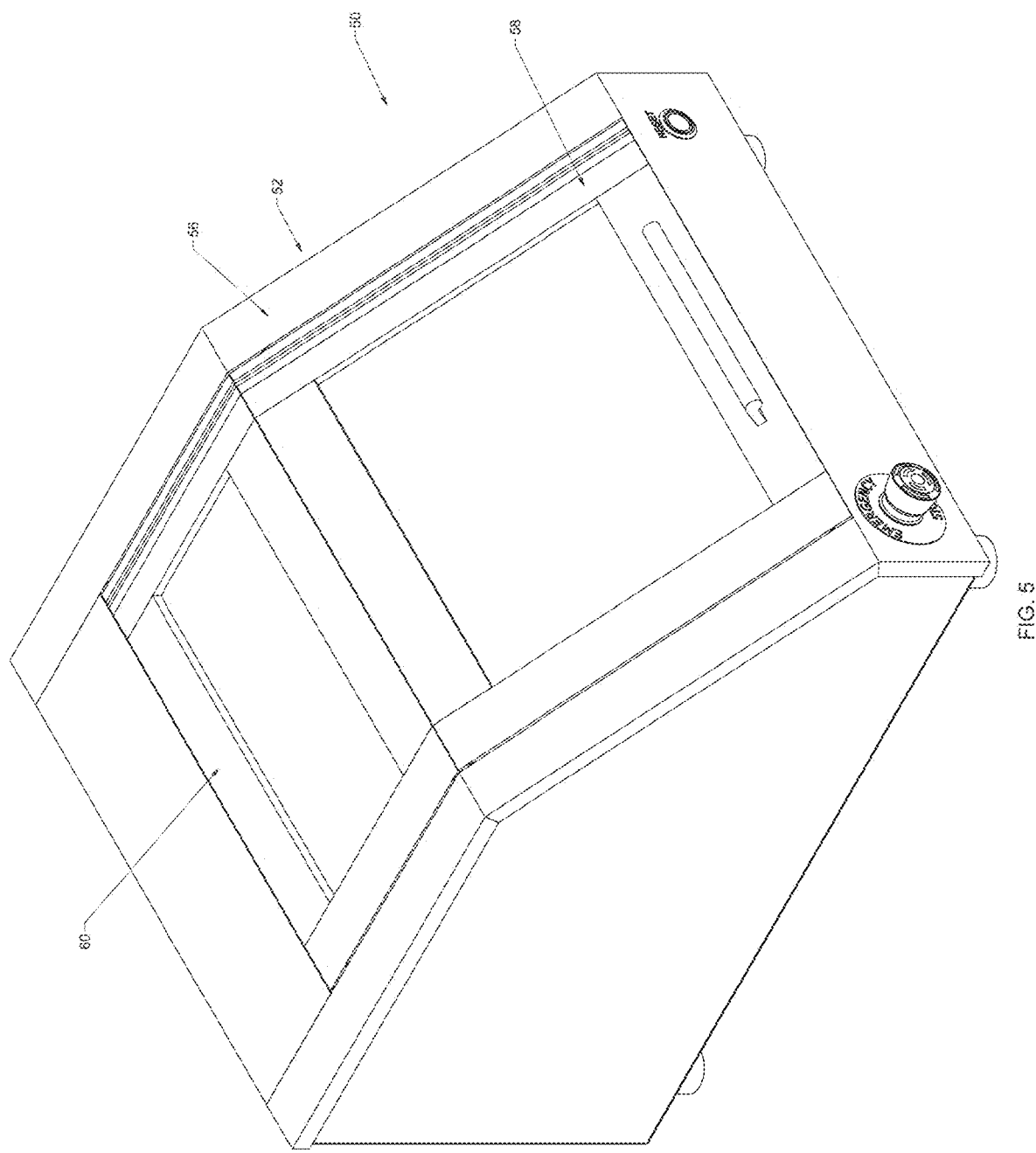
FIG. 5 is a perspective view of a housing for a tooling inspection and analysis system described herein for measuring tooling quality.
Figure 6:
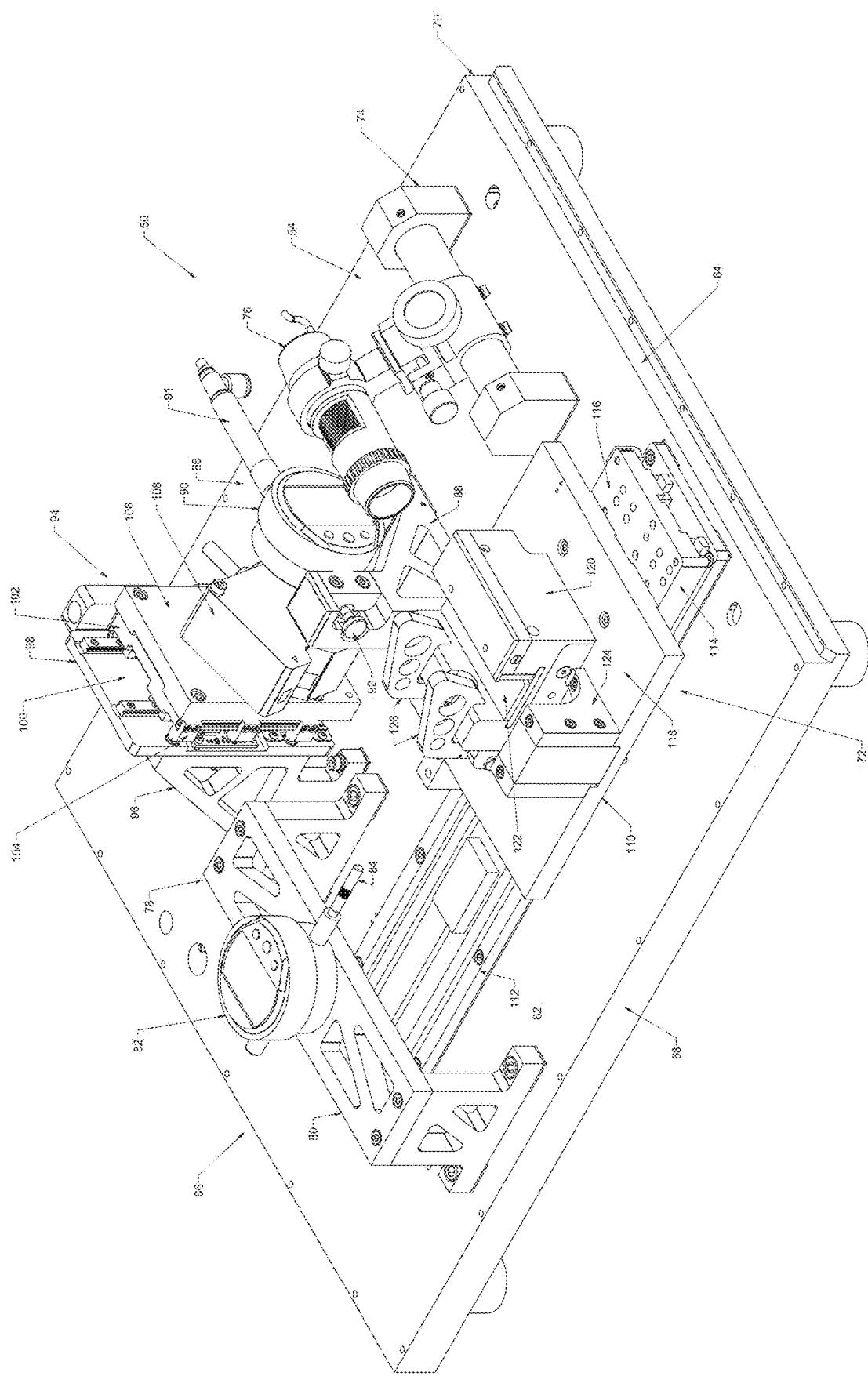
FIG. 6 is a perspective view of the system of FIG. 5 with a cover removed and particularly illustrating the components used for measuring tooling qualities.

Referring to FIGS. 5 and 6, a tooling inspection and analysis system 50 is illustrated. The system 50 is adapted to automatically measure quality of multi-tip tablet punches, such as the punches 10 and 30 discussed above.

The system 50 comprises a housing 52 including a base 54, see FIG. 6, enclosed by a cover 56, see FIG. 5. The cover 56 has an access panel 58 which can be hingedly open about a hinge as at 60, to access an enclosed space 62, see FIG. 6.

The base 54 is generally rectangular and includes a front edge 64, a rear edge 66, a left side edge 68 and a right side edge 70. A carriage assembly 72 is mounted to the base 54 proximate the left side edge 68 and is adapted to move a punch along the Y-axis which is from front to back aligned with the left and right side edges 68 and 70.

A camera stand assembly 74 is mounted to the base 54 adjacent a corner of the front edge 64 and right edge 70. The camera stand assembly 74 supports a microscope camera 76 which is adapted to receive an image of a punch mounted to the carriage assembly 72 in a loading position, discussed below.

A punch outer diameter assembly 78 is mounted to the base 54 overlying a rear end of the carriage assembly 72. The punch outer diameter assembly 78 includes a stand 80 supporting an outer diameter gauge indicator 82. The outer diameter gauge indicator 82 includes a sensor head 84 aligned with the Y-axis and adapted to measure barrel diameter.

A punch overall length assembly 86 comprises a stand 88 and gauge indicator 90 rearwardly of the camera 76. A solenoid 91 controls position of a sensor head 92 to selectively measure overall length of a punch, as described below.

A Z-axis adjusting assembly 94 is mounted to the base rearwardly of the overall length assembly 86. The Z-axis adjustment assembly 94 includes a bracket 96 supporting a linear table positioning apparatus 98 having a fixed plate 100 and a movable plate 102. The fixed plate 100 is secured to the bracket 96 by any known means. The assembly 98 includes a Z-axis linear slide 104, such as a servo drive, for moving the movable plate 102 vertically relative to the fixed plate 100 responsive to a command signal. A mounting plate 106 is mounted to the movable plate 102 and supports a laser sensor 108. The sensor 108 may be a spot type, class 2 laser, such as an LK-HO22 sensor head which is a high-speed laser displacement sensor for precision displacement measurement. The sensor 108 uses optical triangulation to determine position of an object being measured relative to the sensor 108. As will be apparent, other types of laser sensors could be used as well.

The carriage assembly 72 includes a Y-axis adjustment assembly 110 comprising a fixed base 112 and a movable plate 114. The fixed base 112 is secured to the base 54 by any known means. A Y-axis linear slide 116 moves the moveable plate relative to the fixed base 112 responsive to a command signal. A mounting plate 118 is mounted to the movable plate 114 and supports a carriage slide table 120 having a cavity 122 for supporting a multi-tip tablet punch (not shown). The cavity 122 is aligned with the X-axis, parallel with the front edge 64. A reference block 124 is mounted to the mounting plate 118 aligned with the cavity 122 for supporting the head of a punch, in use. A pair of spring-loaded hold down arms 126 are mounted to the slide table 120 for supporting a punch in the cavity 122, as described below.

Figure 7:
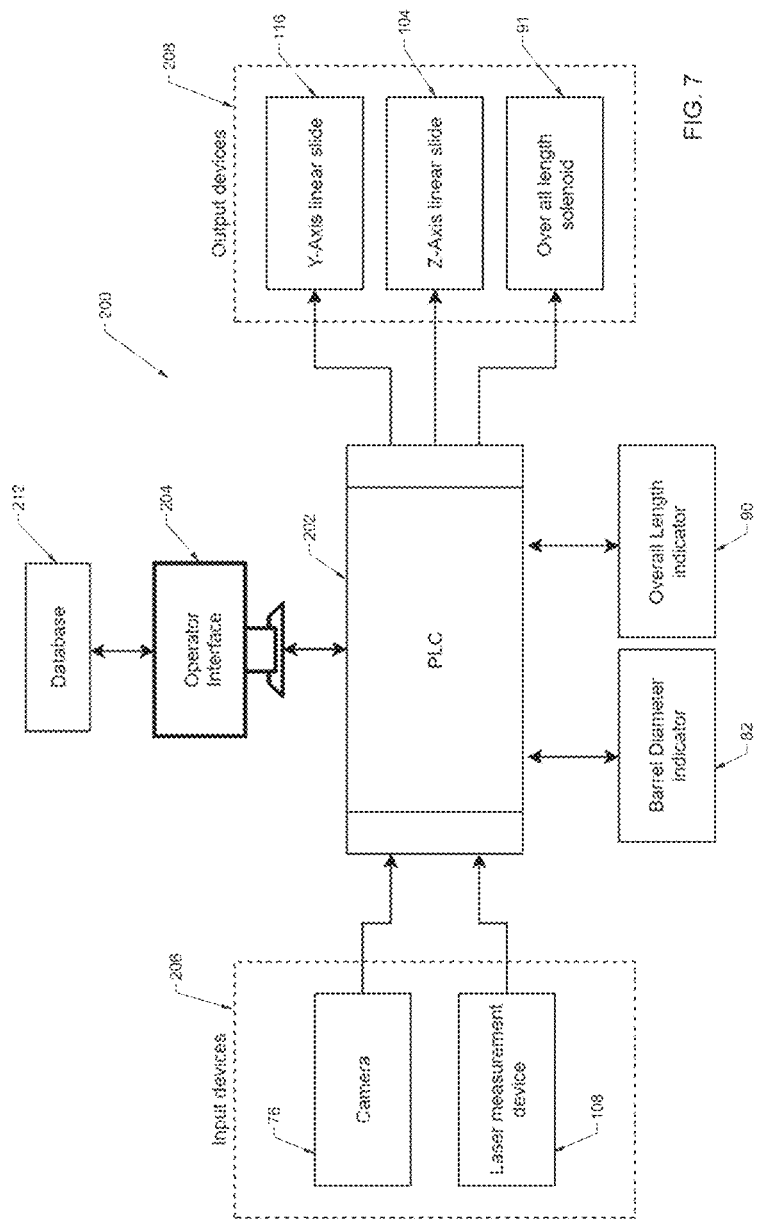
FIG. 7 is a block diagram of the system of FIG. 6.

Referring to FIG. 7, a block diagram illustrates a control system 200 for controlling operation of the tooling inspection and analysis system 50. The control system 200 includes a programmable logic controller (PLC) 202 for connection to the various input devices 206 and output devices 208. The PLC 202 is an industrial control system including a processor operating in accordance with a control program stored in a memory, as is conventional. The PLC 202 is connected to the overall length indicator 90 and the related solenoid 91. The PLC 202 controls the solenoid 91 to measure punch length and receive an input signal representing punch length. The measured length is displayed on the indicator 90. The PLC 202 is also connected to the barrel diameter indicator 82 and is similarly operable to receive an input for barrel diameter and display the diameter on the indicator 82. The PLC 202 is also connected to the camera 76, the Y-axis slide 116, the Z-axis slide 104 and the laser sensor 108, for automatically measuring tooling quality, as described below.

The PLC 202 is connected to an operator interface 204, such as a personal computer. The operator interface 204, as is conventional, would include memory for storing control programs and data, a display, and a keyboard. The operator interface 204 is also connected to database 212. The database 212 is used for storing tool drawing data for standard punches to be tested and measurements for a particular tool which can be stored in an archive for analyzing historical measurement data for a particular punch.

As is apparent, functionality of the PLC 202 and the user interface 204 could be implemented using different hardware configurations.

As part of a measurement operation, the operator interface 204 interacts with the PLC 202, which controls the various input and output devices 206 and 208, as described below. Particularly, the PLC 202 implements the logic for measuring quality of multi-tip tablet punches and commands the slides 104 and 116 to advance to desired positions. The desired positions are determined by finding the coordinates for the various tip positions and performing mathematical operations to find orientation offsets. The PLC 202 also stores the measurements from the laser sensor 108. The user interface 204 stores tooling drawing information in the database 212 and sends the information to the PLC 202 for a respective tool to be measured. The operator interface 204 also sends commands to the PLC 202 to start an auto measure routine and stores the measurement data obtained from the PLC 202 in the database 212.

As described more particularly below, during measurement operation, the control system 200 controls the Y-axis slide 116 to move the slide table 120 so that the cavity 122 is aligned with the laser sensor 108. The laser sensor 108 is then used to determine whether or not the punch being tested is properly aligned with a reference position, which is on the Z-axis and, if not, the Y-axis slide 116 and the Z-axis slide 104 are controlled to move the laser sensor 108 to a position angularly displaced from the reference position, to determine an offset angle. This offset angle is then used to selectively move the laser sensor 108 using Y-axis and Z-axis control to measure cup depth of each of the tips present on the punch being tested.

Figure 8A:
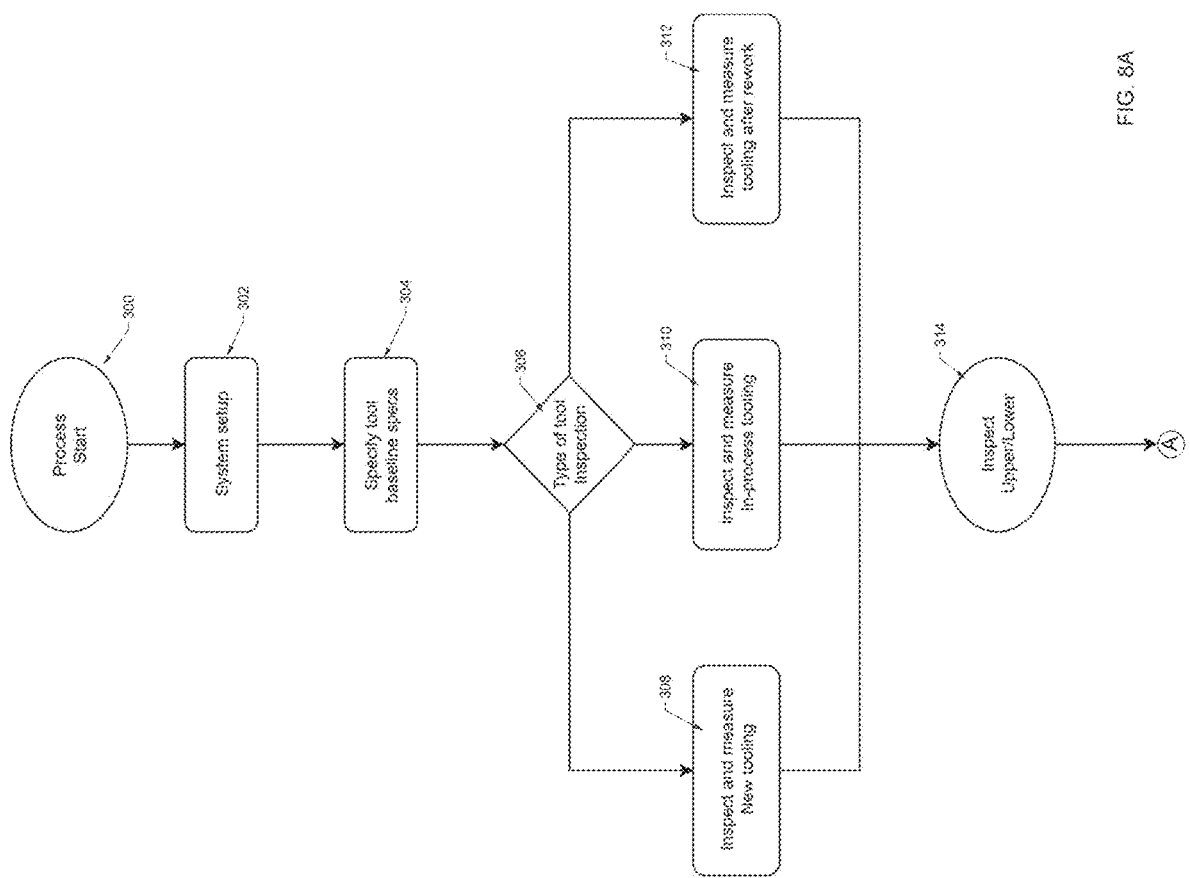
FIGS. 8A and 8B are a flow diagram illustrating a program implemented in the PLC of FIG. 7.
Figure 8B:
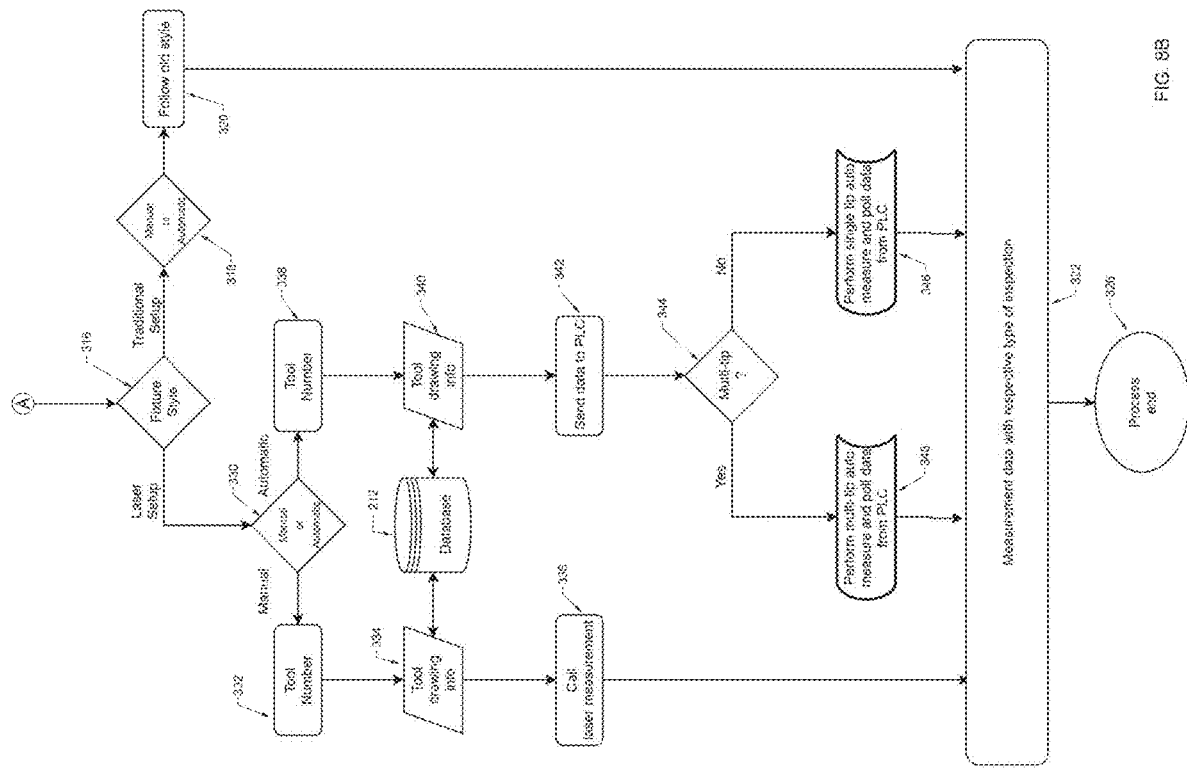

FIGS. 8A and 8B comprise a flow chart illustrating the program logic implemented in the control system 200 for tooling measurements. A setup routine is implemented in the user interface 204, as described, which then commands the PLC 202 to implement the auto measurement routine.

The program begins at a start node 300 and performs a routine system setup routine at a block 302. The user then specifies the tool baseline specification at a block 304, using tooling data in the database 212 for a particular tool to be measured. The tool baseline specifications include information such as number of tips, pitch circle diameter(s) and if a center tip is present. In the exemplary tool discussed above, the punch includes a single pitch circle diameter. However, as will be apparent, a plurality of pitch circle diameters could be included with each pitch circle including a particular number of tips. A decision block 306 determines the type of tool inspection to be performed. This could be to inspect and measure new tooling at a block 308, inspect and measure in process tooling at a block 310 or inspect and measure tooling after rework at block 312. The status of the tooling does not impact the testing performed but is relevant to how data is stored in the database 212. An inspect routine for an upper or lower punch is then begun at a node 314.

The inspect routine begins at a decision block 316 which determines what fixture style should be used. This can use traditional setup or laser setup. The traditional setup does not form part of the invention. If traditional, then a decision block 318 determines whether the set up is manual or automatic. The logic then implements an old-style measurement routine at a block 320 which performs basic measurements and generates measurement data at a block 322 and the logic ends at a node 326.

If laser set up is to be used, from the decision block 316, then a decision block 330 determines whether the test will be performed manually or automatically. If manual, then the user enters a tool number at a block 332 and obtains tool drawing information at a block 334 from the database 212. The user then manually controls the Y and Z-axis positions to obtain laser measurements at a block 336. The program then advances to the block 322, discussed above.

If automatic laser measurement is selected at the block 330, then the user manually enters the tool number at a block 338 and the program obtains tool drawing information from the database 212 at a block 340. The data is sent to the PLC 202 at a block 342. A decision block 344 determines if a multi-tip punch is being measured. If not, then at a block 346 the laser measurement for a single tip tool is performed at a block 346 and the program advances to the block 322.

If a multi-tip tool is to be measured, then the program advances to a block 348 to pull multi-tip data from the PLC 202 using the automated measurement sequence in accordance with the invention, described below. This process results in the PLC 202 performing the auto detect and multi-tip algorithm to identify the working lengths of individual tips and returning the data at the block 322, discussed above.

Figure 10:
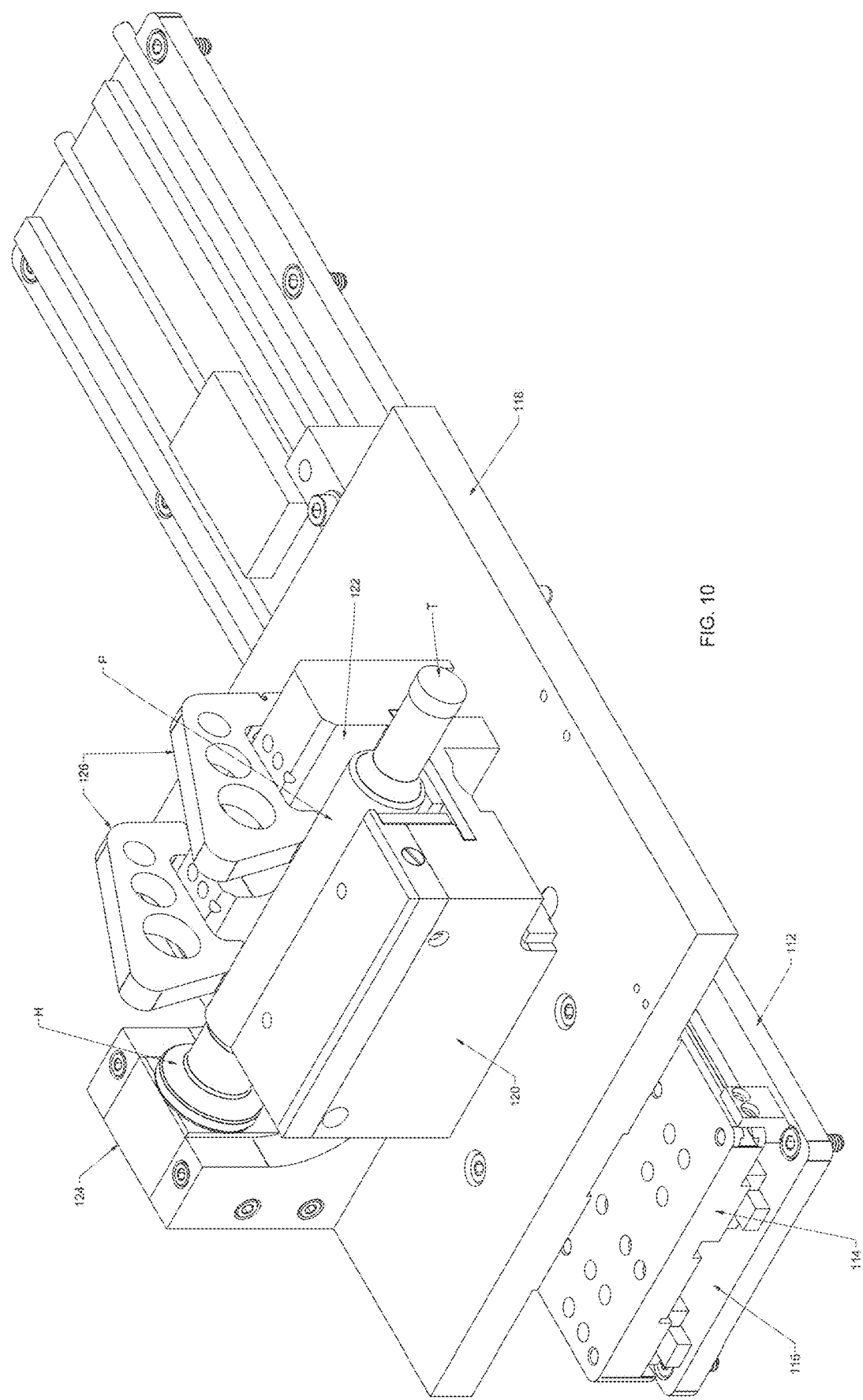
FIG. 10 is a perspective view illustrating a carriage assembly of the system of FIG. 9.

Referring to FIG. 9 and FIG. 10, the system 50 is illustrated with a punch P mounted in the cavity 122. The punch P has a head H which is mounted abutting the reference block 124. The punch P is held in place with the hold down arms 126 in a select position. As mounted, the tip head T is axially aligned with the camera 76 along the X-axis. The camera image can be displayed on the user interface display for aiding in alignment. For simplicity, the punch P is illustrated with a tip head T omitting details of the specifics of the tips as these figures are intended to illustrate support of the punch P.

Figure 13:
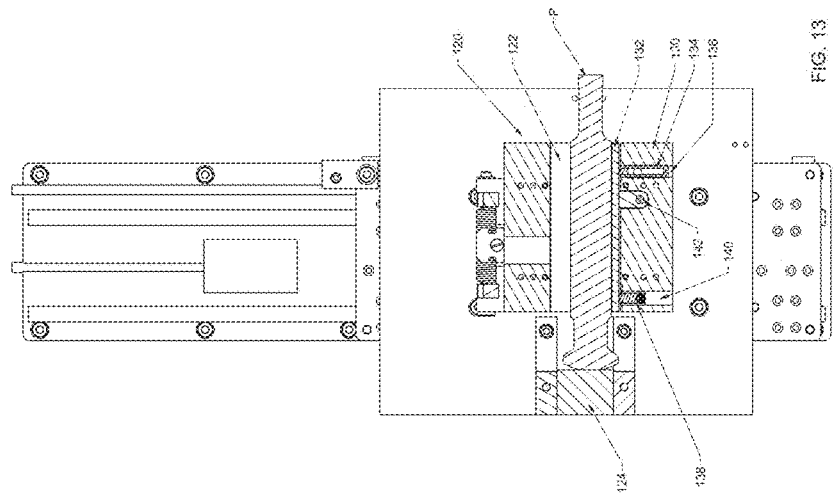
FIG. 13 is a sectional view taken along the line 13-13 of FIG. 12 illustrating alignment of a multi-tip tablet punch.
Figure 11:
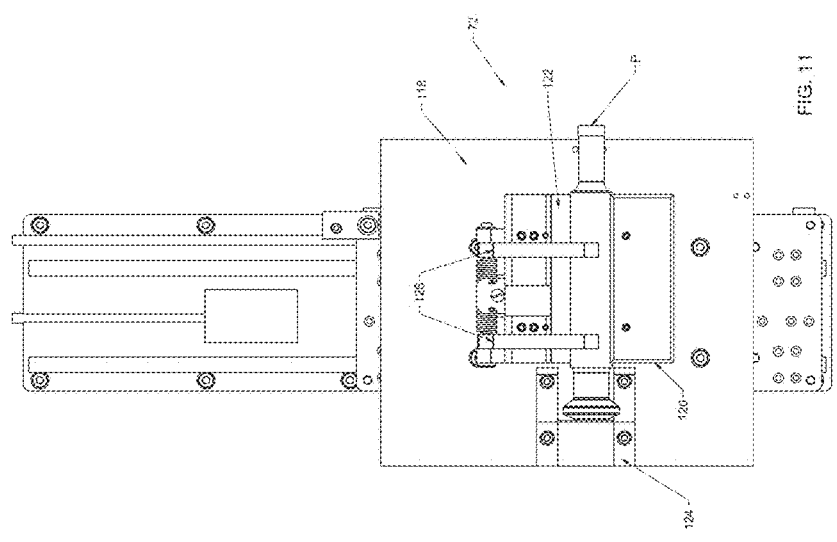
FIG. 11 is a plan view of the carriage assembly of FIG. 10.
Figure 12:
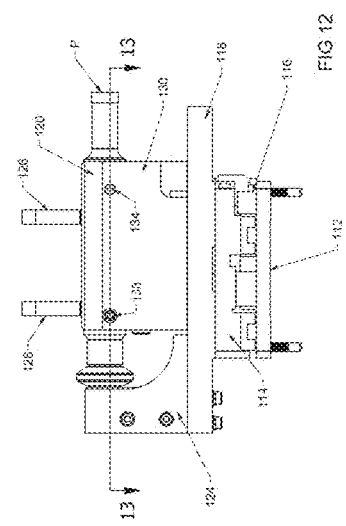
FIG. 12 is a front elevation view of the carriage assembly of FIG. 10.

Referring to FIGS. 11-13, it is necessary to ensure that the punch P is aligned in the slide table 120 with the X-axis. As such, the slide table 120 includes a front block 130 supporting a plate 132 along a front of the cavity 122. A spring plunger 134 is positioned in an opening 136 on the right side of the block 130 abutting the plate 132. An adjustment screw 138 is positioned in an opening 140 at a right side of the block 130. The plate 132 is pivotally mounted to the block 130 at a pivot connection 142.

For alignment purposes, a gauge block may be used in place of a punch to calibrate alignment with the X-axis. The Y-axis slide 116 is controlled to align the end of the gauge block with the laser sensor 108. Using information from the sensor 108, the user can tighten or loosen the fine thread adjustment screw 138 to alter the angle of the plate 32 about the pivot connection 142 to align the gauge block. The spring plunger 134 supplies equilibrium force to maintain punch position.

This alignment procedure may be performed, as necessary or desired.

The control system 200 uses the multi-tip logic for measuring working length of punches with multiple tips. This logic provides repeated and generic logic for any number of tips, including B or D type tools to be inspected. With these tools, there are several obstacles to be considered. These include different sizes and variation of shapes and positions of the tips. Operator error can result from aligning the tool at different orientations in the cavity 122 than desired. The logic must also deal with parameters specified by drawings and dimensional variances.

The tool drawings provide limited information and the spacing, shape and cup depth of individual sets of tools can be different. Generating coordinates for the center or the lowest point is a difficult procedure and with new tools frequently coming into the market could require constant updating of a database. Additionally, the operator who loads the tool into the fixture needs to position it in the same position and accurately oriented every time and for every tool. This is difficult and not repeatable considering a small change in angle would result in a large variation in measured cup depth.

Using the tool drawings, the user will enter various information into the database for the particular tool including the number of pitch circles, the number of tips in each pitch circle, the pitch circle diameter and the tip diameter. FIG. 2, discussed above, shows typical drawing information available. Considering this information, one can start with the assumption that the operator would orient the tool based on the Y and Z overlay having the center of the lowermost tip 20 on the Z-axis overlay as shown in FIG. 3.

Figure 14:
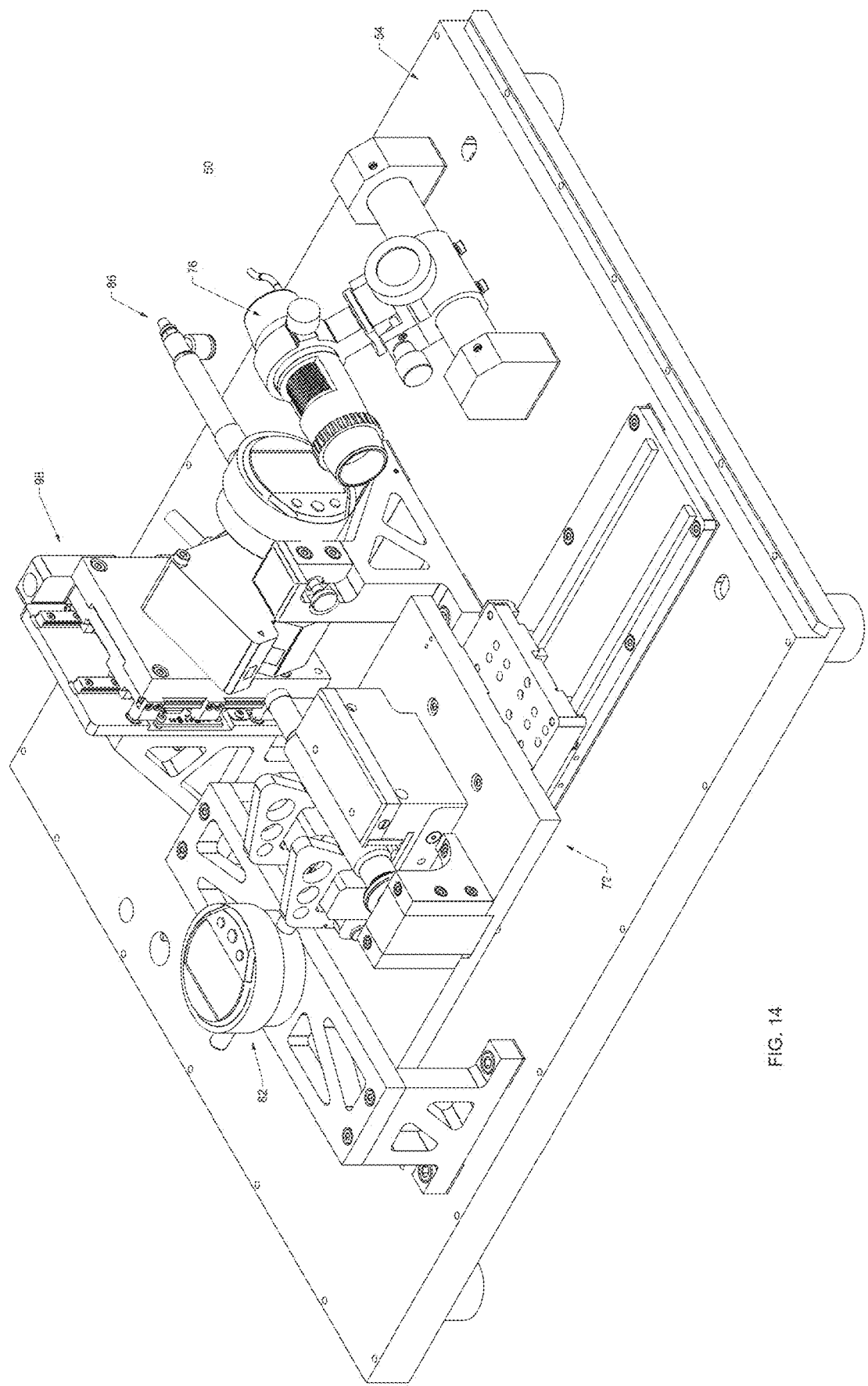
FIG. 14 is a perspective view, similar to FIG. 5, illustrating the multi-tip tablet punch in a measurement position.
Figure 15:
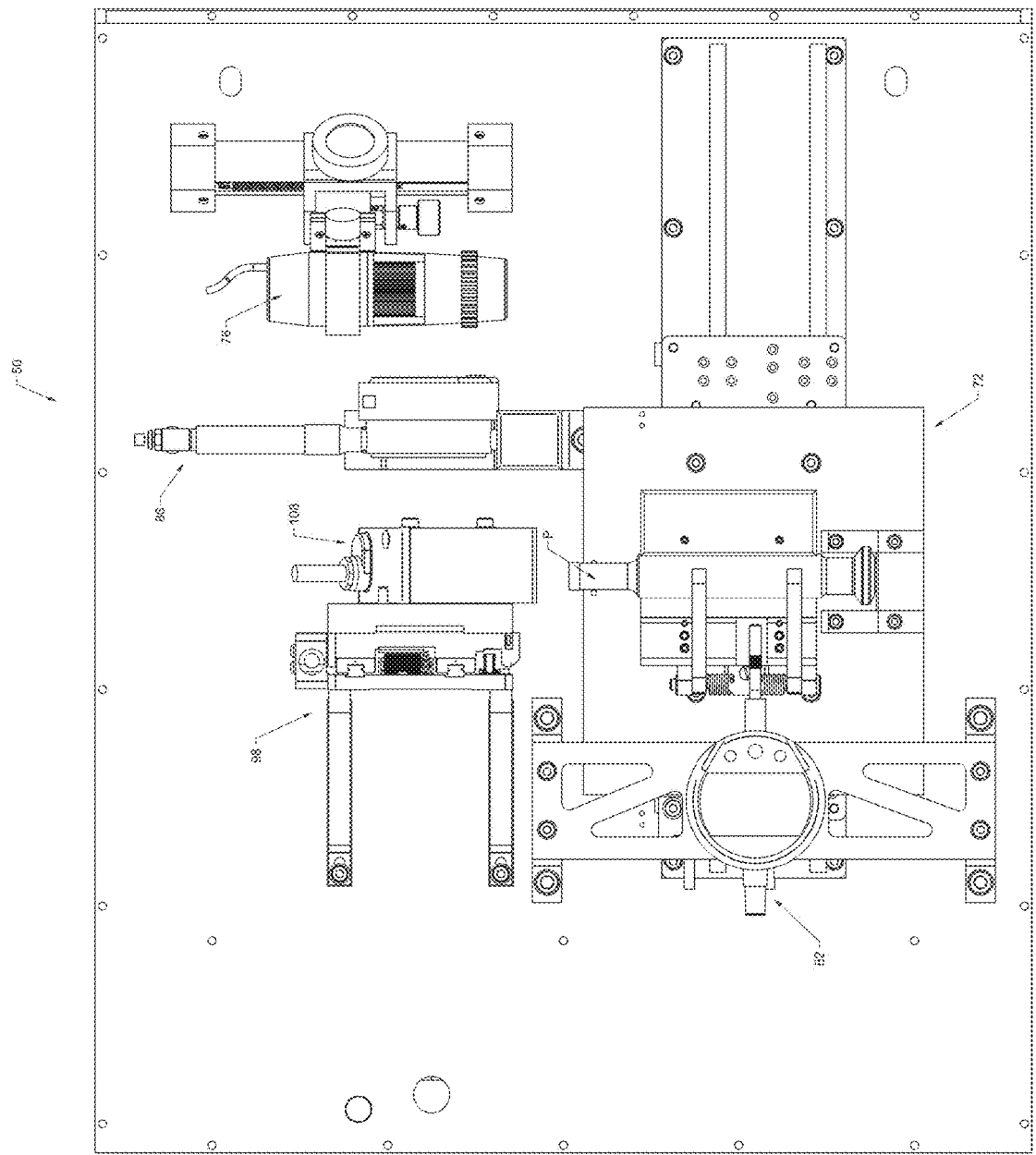
FIG. 15 is a plan view of the system of FIG. 14.

The P1 diameter gives the radius of the working area from the center of the punch. This is used to obtain the coordinates of the Y and the Z-axis for the laser 108 to find the outer edge of the tool. A perfectly oriented tool is provided with a tip 20 in a position shown in FIG. 16A. The coordinates (a,b) are on the Z-axis displaced from the Y-axis an amount equal to the working diameter P1. The logic initially moves the carriage assembly 72 to the position shown in FIGS. 14 and 15 aligned with the laser sensor 108. Based on the P1 diameter, the PLC 202 derives the coordinates to move the Y-axis slide 116 and the Z-axis slide 108 for the sensor 108 to measure coordinate position (a, b). The laser 108 is looking for the edge of one of the tips 20 at this coordinate position. If there is an operator error in orienting the punch and the error is in the clockwise direction, see FIG. 16B, the algorithm identifies the loss of signal and performs an auto search routine for the edge of the tool with the following equations:

Clockwise direction equations, $$Y\text{-Axis} = \left(Y\text{-Axis Punch Center} + \left(\frac{P1}{2} \times \sin(\text{clockwise laser angle})\right)\right)$$

$$Z\text{-Axis} = \left(Z\text{-Axis Punch Center} + \left(\frac{P1}{2} \times \cos(\text{clockwise laser angle})\right)\right)$$

Figure 17:
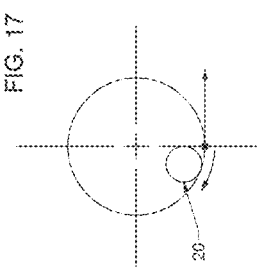
FIG. 17 is a view, similar to FIG. 16B, illustrating how axis positions are changed to find the edge of the tool.

Particularly, the logic will follow the equations by periodically increasing the laser angle which will result in clockwise movement by moving the Y-axis position to the left and the Z-axis position upwardly in combination, as shown in FIG. 17. This is done incrementally to find the coordinates for the edge of the tip 20.

Figure 16C:
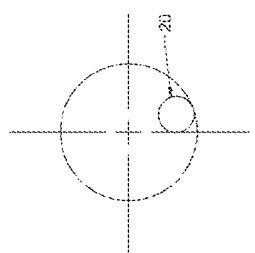
FIGS. 16A, 16B and 16C illustrate measurement of a reference position of one of the tips for determining alignment.
Figure 16B:
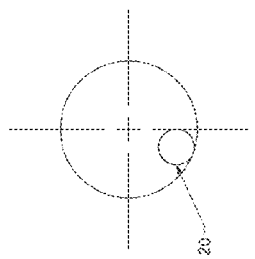
Figure 16A:
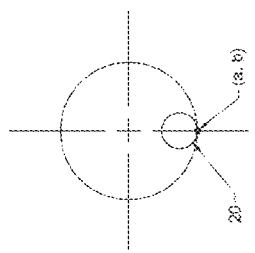
Figure 13:
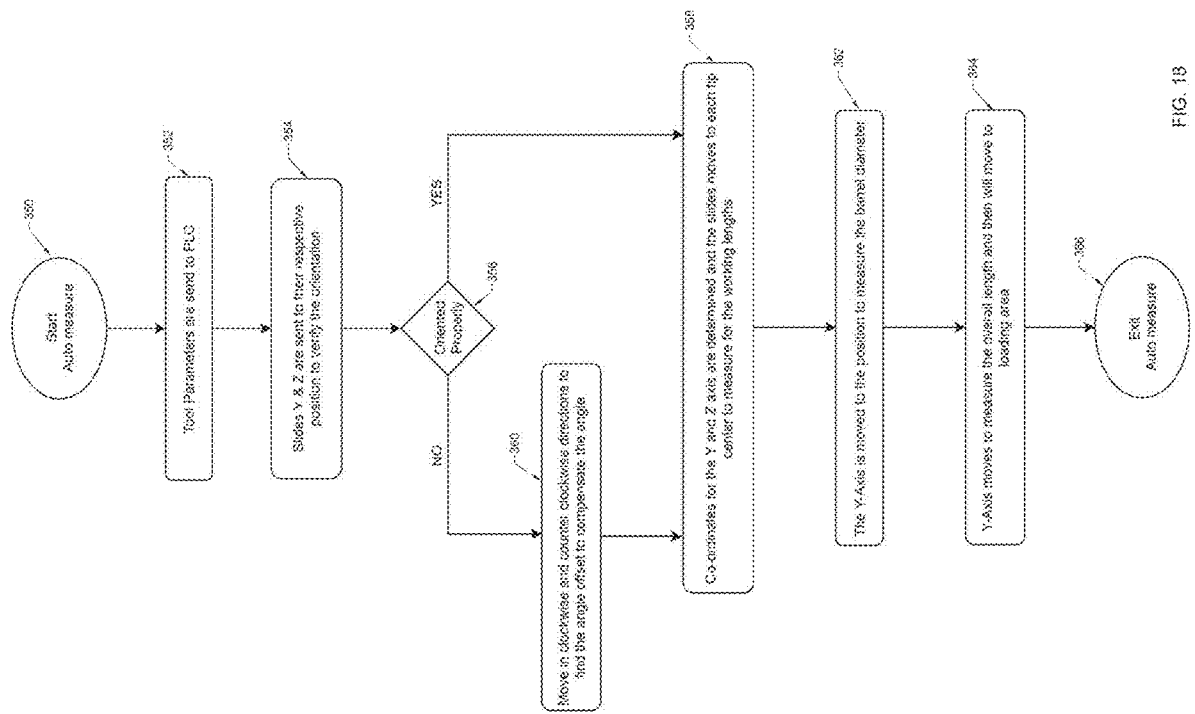

Similarly, if the angle is off in orientation in the counter-clock-wise direction, see FIG. 16C, then the following equations are used to control Y-axis and Z-axis position in the opposite direction. This uses Counterclockwise direction equations, $$Y\text{-Axis} =$$
$$\left(Y\text{-Axis Punch Center} - \left(\frac{P1}{2} \times \sin(\text{Counter clockwise laser angle})\right)\right)$$

$$Z\text{-Axis} =$$
$$\left(Z\text{-Axis Punch Center} + \left(\frac{P1}{2} \times \cos(\text{Counter clockwise laser angle})\right)\right)$$

These equations will control the Y-axis slide 116 and the Z-axis slide 104 to move on the P1 circumference to find the edge of the tip in the counterclockwise direction, opposite that shown in FIG. 17.

The above equations compensate for the human error in orienting the tool perpendicular and parallel to the Y-axis and Z-axis overlays. This also gives coordinates for the edge of the tool for every tool irrespective of the size and variance in the tool parameters.

By calculating the coordinates based on the laser angle for the edge of the tool, the difference with the reference provides a variance in the form of a variance angle. This variance angle can be used to find the coordinates for the center of each tip using the information from the drawing. The equations for generating multi-tip coordinates are as follows:

Equations for generating multi tip co-ordinates

For (Tip number = 1; Tip number++; Tip number <= No of Tips)

{

$$Y_{co\text{-}ordinates} = Y_{Axis\ center} -$$
$$\left(\frac{\text{Pitch circle Diameter}}{2} \times \sin\left(\left(\text{Tip number} \times \frac{360}{\text{No of Tips}}\right) - \right.\right.$$
$$\left.\left.\text{Clockwise laser angle} + \text{Counter clockwise laser angle}\right)\right)$$

$$Z_{co\text{-}ordinates} = Z_{Axis\ center} - \left(\frac{\text{Pitch circle Diameter}}{2} \times\right.$$

$$\cos\left(\left(\text{Tip number} \times \frac{360}{\text{No of Tips}}\right) - \text{Clockwise laser}\right.$$
$$\left.\text{angle} + \text{Counter clockwise laser angle}\right)\right)$$

}

In the above equations, the Y-axis center and Z-axis center are the center of each tip and vary based on whether the tool is a B type or D type. The tip number changes based on the number of tips available in a pitch circle and starts from 1 to the total number of tips in the pitch circle. The clockwise angle is the angle offset in the clockwise direction. The clockwise angle is zero if there is no offset. The counterclockwise angle is the angle offset in the counterclockwise direction. This will be zero if there is no angle offset present.

Particularly, based on the number of tips and the pitch circle diameter, the database knows the tip center position for each tip relative to the Y-axis and Z-axis, assuming proper orientation, see FIG. 2. If there is a variance angle, then this variance angle is used to recalculate the coordinates for each tip based on the variance angle using the equations discussed above.

The same equations are followed for all of the pitch circles that are present to find the coordinates along the Y-axis and the Z-axis. Using this, the algorithm measures the cup depth, and thus working length, for each tip for storage in the database.

FIG. 18 illustrates a flow diagram for performing the auto measure routine referenced above relative to the block 348 of FIG. 8. This routine begins at a node 350 when the auto measure routine starts. Tool parameters for the tool being mentioned are sent to the PLC 202 at a block 352, Based on the information in the drawings, the Y-axis and Z-axis slides are sent to the respective positions at a block 354 to verify orientation. Particularly, as discussed above, relative to FIG. 16A, the Y-axis is set to the center and the Z-axis position is set to the Z-axis center minus one-half of P1. A decision block 356 determines whether or not the punch is oriented properly. If so, then the program advances to the block 358. If not, then at a block 360, the slides implement the equations discussed above relative to FIGS. 16B and 16C to move in clockwise and counterclockwise directions to find the angle offset. The program then advances to the block 358.

At the block 358, after finding the tip and compensating for the offset and orientation, if any, the coordinates for the Y and Z slide positions are populated by the equations above, and the slides 104 and 116 are controlled to move to each tip center to measure for the working length. After measuring all the working lengths, the Y-axis slide 116 is moved to a position so that the punch P contacts the barrel diameter sensor 84 to measure the barrel diameter at a block 362 using the barrel indicator 82. Once the barrel diameter measurement is completed, then the Y-axis slide 116 moves the punch P in line with the overall length measurement indicator 90 to measure the overall length at a block 364. The solenoid 91 is actuated so that the sensor 92 contacts the punch P. The Y-axis slide 116 then moves to the loading area being the position shown in FIG. 9. The program then exits the auto measure routine at a node 366.

At the completion of the routine, a display is generated on the display of the user interface 204 showing each of barrel diameter, overall length and working length for each tip, and variation of each of these parameters from the specification. This information is then stored in the database 212 for historical reference.

A change in barrel diameter and/or overall length between different tools will result in a difference in the position of the center axis of the tool in the cavity 122. This is illustrated in FIGS. 19 and 20. For the Z-axis there is an offset based on overall length due to the triangulation used by the laser sensor 108. In the illustrated embodiment, the displacement laser is mounted at a 20-degree angle to the punch face. This angle is intended to improve the signal quality while measuring a punch face with a reflective surface. If a triangulation displacement laser is mounted parallel to the punch face, the equation for offset, below, is not required. Moreover, if a different mounting angle is used, then the angle in the equation will change, as is apparent. Both the Y-axis and the Z-axis positions of the tool center are offset based on differences in barrel diameter.

To address these issues, the program may be adapted to measure the overall length and barrel diameter prior to the working length to compensate for the offset. This helps in positioning the tool accordingly to the respective tool to identify the edge of the tip especially for multi-tip, The offsets are illustrated by the following equations.

Barrel diameter offset=Reference Barrel diameter−Measured barrel diameter.

Overall length offset=(Measured overall length−Reference overall length)×tan(20°)

Offsets to the axis:

Y-Axis laser center=Y-Axis reference center+Barrel diameter offset; and

Z-Axis laser center=Z-Axis reference center+Barrel diameter offset+Overall length offset.

Figure 21:
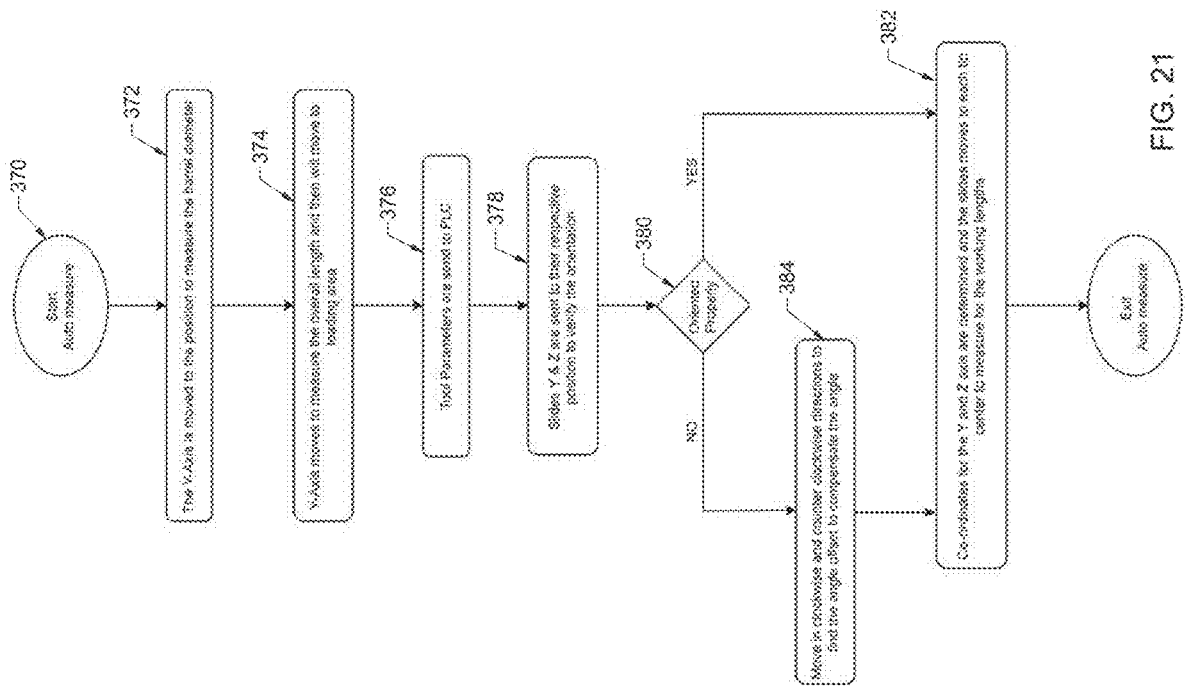
FIG. 21 is a flow diagram, similar to FIG. 18, illustrating compensation for variation in tool length or barrel diameter.

FIG. 21 illustrates a modified program for compensating for these offsets. This routine begins at a node 370 when the auto measure routine starts. The Y-axis slide 116 is moved to a position so that the punch P contacts the barrel diameter sensor 84 to measure the barrel diameter at a block 372 using the barrel indicator 82. Once the barrel diameter measurement is completed, then the Y-axis slide 116 moves the punch P in line with the overall length measurement indicator 90 to measure the overall length at a block 374. The solenoid 91 is actuated so that the sensor 92 contacts the punch P. The Y-axis slide 116 then moves to the loading area being the position shown in FIG. 9. These measurements are used to modify the laser center position of the tool using the equations above.

The Tool parameters for the tool being mentioned are sent to the PLC 202 at a block 376. Based on the information in the drawings, the Y-axis and Z-axis slides are sent to the respective positions at a block 378 to verify orientation. Particularly, as discussed above, relative to FIG. 16A, the Y-axis is set to the center and the Z-axis position is set to the Z-axis center minus one-half of P1. A decision block 380 determines whether or not the punch is oriented properly. If so, then the program advances to the block 382. If not, then at a block 384, the slides implement the equations discussed above relative to FIGS. 16B and 16C to move in clockwise and counterclockwise directions to find the angle offset. The program then advances to the block 382.

At the block 382, after finding the tip and compensating for the offset and orientation, if any, the coordinates for the Y and Z slide positions are populated by the equations above, and the slides 104 and 116 are controlled to move to each tip center to measure for the working length. After measuring all the working lengths, the program then exits the auto measure routine at a node 366.

At the completion of the routine, a display is generated on the display of the user interface 204 showing each of barrel diameter, overall length and working length for each tip, and variation of each of these parameters from the specification. This information is then stored in the database 212 for historical reference.

Using the system 50 described herein, multi-tip positioning is provided by affixing a punch to its barrel along the X-axis and controlling relative movement of the punch and a sensor along a Y-axis and a Z-axis using mathematical calculations. In the illustrated embodiment, this is done by moving the punch relative to a sensor along the Y-axis and moving the sensor relative to the punch along the Z-axis in order to obtain the measurements. The system 50 also compensates tip orientation misalignment by referencing laser feedback and moving the punch along the Y-axis and the sensor along Z-axis using these mathematical calculations. Also, the support structure for the punch allows precise alignment of orientation in the X-axis to provide perpendicular alignment with the Y-axis, Tip orientation may be provided using live image via the camera 76 of the punch tips.

The multi-tip algorithm is also used for calculating working length with a punch, such as the punch 30 illustrated in FIG. 4. In this instance, the tip heads are elliptical and offset from the center. The ellipsis is defined relative to an A axis and B axis through its center and the center of each tip being offset from the center of the tool. The tool drawings include information on how the tips are offset from the center of the tool and knowing the A and B lengths can determine the variance angle. This can then be used to determine variance in position of the center of each tip.

A tablet may have a split line as shown in FIG. 22. This requires a bisect at a center of the tip. Having a bisect on the tip would result in the center not being the lowest point of the tool. To compensate for the bisect the operator is asked to select if there is a bisect on the tool and in which orientation the tool is loaded. Since in the tablet drawing it is mentioned the width of the bisect, based on the tip orientation the offset is added to the respective axis to move further to the other side of the bisect and measure the working length. This offset uses the following equations:

If (oriented horizontally)

{Y-Axis laser center=Y-Axis reference center+Barrel diameter offset−(Bisect width/2)};

Else

{Z-Axis laser center=Z-Axis reference center+Barrel diameter offset+Overall length offset−(Bisect width/2)}.

Thus, in accordance with the invention, a system is provided for automatically measuring tool quality of a multi-tip tool substantial saving in time and with improved accuracy.

The present invention has been described with respect to flowcharts and block diagrams. It will be understood that each block of the flowchart and block diagrams can be implemented by computer program instructions. These program instructions may be provided to a processor to produce a machine, such that the instructions which execute on the processor create means for implementing the functions specified in the blocks. The computer program instructions may be executed by a processor to cause a series of operational steps to be performed by the processor to produce a computer implemented process such that the instructions which execute on the processor provide steps for implementing the functions specified in the blocks. Accordingly, the illustrations support combinations of means for performing a specified function and combinations of steps for performing the specified functions. It will also be understood that each block and combination of blocks can be implemented by special purpose hardware-based systems which perform the specified functions or steps, or combinations of special purpose hardware and computer instructions.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Also, for example, the physical aspects of the invention should not be read to limit the invention to a carriage which moves only along a Y-axis and a sensor which moves only along a Z-axis; other configurations for moving the multi-tip tablet punch relative to the sensor to measure distance are known by those skilled in the art. Other embodiments may be within the scope of the following claims.

The foregoing disclosure of specific embodiments is intended to be illustrative of the broad concepts comprehended by the invention.

The invention claimed is:

1. A tooling inspection and analysis system for measuring tooling quality of a multi-tip tablet punch having a barrel with a plurality of tips each having a tip cup for forming a tablet, comprising:
   a base;
   a carriage assembly having a cavity for supporting a multi-tip tablet punch, which when in use is aligned with an X-axis, and a Y-axis linear slide mounting the carriage assembly to the base for movement relative to the base along a Y-axis;
   a sensor adapted to measure distance,
   wherein, at least one of said carriage assembly and sensor is configured to move relative to each other along a Y-axis and a Z-axis; and
   a programmable controller operatively connected to the carriage assembly and sensor, the programmable controller being programmed to move at least one of the carriage assembly and the sensor relative to each other to automatically align the sensor to measure a working length of each tip of the multi-tip tablet punch mounted in the cavity.

2. The tooling inspection and analysis system of claim 1 further comprising a Z-axis linear slide mounting the sensor to the base for movement relative to the base along a Z-axis, and the programmable controller is operatively connected to the Y-axis linear slide, the Z-axis linear slide and the sensor, the programmable controller being programmed to move the carriage assembly and the sensor to automatically align the sensor to measure a working length of each tip of a multi-tip tablet punch mounted in the cavity.

3. The tooling inspection and analysis system of claim 1 wherein the multi-tip punch has a plurality of tips aligned in a pitch circle about a center of the multi-tip tablet punch to define an angle between each tip relative to the center, the programmable controller being programmed to move the sensor relative to the multi-tip tablet punch mounted in the cavity to coordinate positions based on the angle between each tip.

4. The tooling inspection and analysis system of claim 3 wherein the programmable controller is programmed to measure offset of the multi-tip tablet punch relative to a desired orientation in the cavity and to move the sensor relative to the multi-tip tablet punch mounted in the cavity to coordinate positions based on the angle between each tip adjusted based on the offset.

5. The tooling inspection and analysis system of claim 1 wherein the sensor comprises a laser displacement sensor.

6. The tooling inspection and analysis system of claim 5 wherein the laser displacement sensor uses optical triangulation to determine position.

7. The tooling inspection and analysis system of claim 1 further comprising a barrel diameter indicator mounted to the base for measuring diameter of the barrel of the multi-tip tablet punch mounted in the cavity and the programmable controller is programmed to position the carriage assembly to measure the barrel diameter.

8. The tooling inspection and analysis system of claim 1 further comprising a length indicator mounted to the base for measuring overall length of the multi-tip tablet punch mounted in the cavity and the programmable controller is programmed to position the carriage assembly relative to the punch length indicator to measure the overall length.

9. The tooling inspection and analysis system of claim 8 further comprising a solenoid controlled by the controller for moving the length indictor along the X-axis to measure the overall length of the multi-tip tablet punch.

10. The tooling inspection and analysis system of claim 1 further comprising a camera mounted to the base and aligned with the cavity at a loading position of the carriage assembly and the camera is connected to the programmable controller for display on a user interface display.

11. A tooling inspection and analysis system for measuring tooling quality of a multi-tip tablet punch having a barrel with a plurality of tips each having a tip cup for forming a tablet, comprising:
   a base;
   a carriage assembly having a cavity for supporting a multi-tip tablet punch, which when in use is aligned with an X-axis, and a Y-axis linear slide mounting the carriage assembly to the base for movement relative to the base along a Y-axis;
   a sensor adapted to measure distance;
   a database storing data for a plurality of multi-tip tablet punches and the stored data for a particular punch from the plurality of multi-tip tablet punches defines orientation of each tip relative to a center of the multi-tip tablet punch; and
   a programmable controller operatively connected to the carriage assembly and the sensor, the programmable controller obtaining data from the database for the multi-tip tablet punch being tested and being programmed to move the at least one of the carriage assembly and the sensor relative to each other to determine orientation of the multi-tip tablet punch being tested in the cavity relative to a reference position and determine offset from the reference position and to automatically align the sensor responsive to the offset to measure a working length of each tip of the multi-tip tablet punch being tested.

12. The tooling inspection and analysis system of claim 11 further comprising a Z-axis linear slide mounting the sensor to the base for movement relative to the base along a Z-axis, and the programmable controller is operatively connected to the Y-axis linear slide, the Z-axis linear slide and the sensor, the programmable controller being programmed to move the carriage assembly and the sensor to automatically align the sensor to measure a working length of each tip of a multi-tip tablet punch mounted in the cavity.

13. The tooling inspection and analysis system of claim 11 wherein, for multi-tip punches having a plurality of tips aligned in a pitch circle about a center of the multi-tip punch, the database stores a tip diameter of each tip and a pitch circle diameter for the pitch circle and the programmable controller, upon calculating a working area diameter of the pitch circle using the tip diameter and the pitch circle diameter, is programmed to move the sensor relative to the multi-tip tablet punch mounted in the cavity to measure angular position of an edge of the tip proximate the reference position relative to the reference position to determine an angular offset.

14. The tooling inspection and analysis system of claim 13 wherein the programmable controller is programmed to move the sensor relative to the multi-tip tablet punch mounted in the cavity to coordinate positions based on an angle between each tip and adjusted by the angular offset to measure the working length of each tip of the multi-tip tablet punch being tested.

15. The tooling inspection and analysis system of claim 11 wherein the sensor comprises a laser displacement sensor.

16. The tooling inspection and analysis system of claim 15 wherein the laser displacement sensor uses optical triangulation to determine position.

17. The tooling inspection and analysis system of claim 11 further comprising a barrel diameter indicator mounted to the base for measuring diameter of the barrel of the multi-tip tablet punch mounted in the cavity and the programmable controller is programmed to position the carriage assembly to measure the barrel diameter.

18. The tooling inspection and analysis system of claim 11 further comprising a length indicator mounted to the base for measuring overall length of the multi-tip tablet punch mounted in the cavity and the programmable controller is programmed to position the carriage assembly relative to the length indicator to measure the overall length.

19. The tooling inspection and analysis system of claim 18 further comprising a solenoid controlled by the programmable controller for moving the length indictor along the X-axis to measure the overall length of the multi-tip tablet punch.

20. The tooling inspection and analysis system of claim 18 further comprising a camera mounted to the base and aligned with the cavity at a loading position of the carriage assembly and the camera is connected to the programmable controller for display on a user interface display.

21. A tooling inspection and analysis system for measuring tooling quality of a multi-tip tablet punch having a barrel with a plurality of tips each having a tip cup for forming a tablet, comprising:
a base;
a carriage assembly having a cavity for supporting a multi-tip tablet punch, which when in use is aligned with an X-axis, the carriage assembly having a plate mounted in the cavity and an adjustment screw to adjust orientation of the plate to adjust alignment of the multi-tip tablet punch in the cavity relative to the X-axis, and a Y-axis linear slide mounting the carriage assembly to the base for movement relative to the base along a Y-axis;
a sensor adapted to measure distance to an object; and
a programmable controller operatively connected to the Y-axis linear slide and the sensor, the programmable controller being programmed to move the carriage assembly to align the sensor to measure a gauge block mounted in the cavity to determine alignment of the plate relative to the X-axis responsive to adjustment of orientation of the plate.

22. A tooling inspection and analysis system of claim 21 wherein the plate is pivotally mounted to a side wall in the cavity and the adjustment screw abuts one end of the plate and a spring plunger biases another end of the plate, the pivot being positioned between the adjustment screw and the spring plunger.

* * * * *